Figure 1:
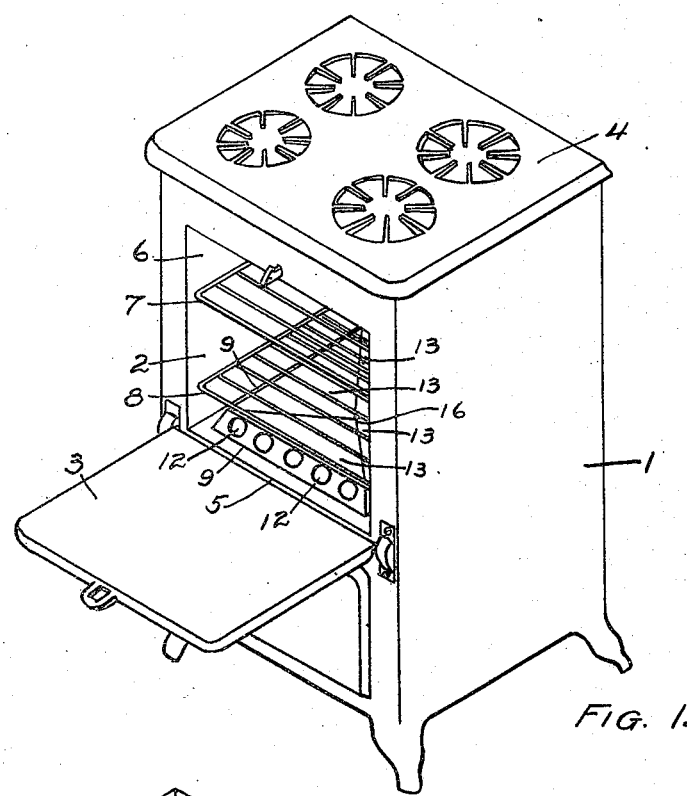

C. H. RESOR.
OVEN HEAT DISTRIBUTER.
APPLICATION FILED OCT. 11, 1915.

1,174,520.

Patented Mar. 7, 1916.

WITNESSES:
W. H. Chatfield
Elsie Blasch

INVENTOR.
Charles H. Resor
BY John W. Strehli
ATTORNEY.

UNITED STATES PATENT OFFICE.

CHARLES H. RESOR, OF CINCINNATI, OHIO.

OVEN HEAT-DISTRIBUTER.

1,174,520.   Specification of Letters Patent.   Patented Mar. 7, 1916.

Application filed October 11, 1915. Serial No. 55,173.

*To all whom it may concern:*

Be it known that I, CHARLES H. RESOR, a citizen of the United States, and a resident of the city of Cincinnati, Hamilton county, in the State of Ohio, have invented certain new and useful Improvements in Oven Heat-Distributers, of which the following is a specification.

The object of my invention is to provide a cheap, simple, unique and highly efficient device to be used in connection with the oven of a gas, gasolene or oil stove, in order to equally and continuously distribute the heat over the whole oven, so that the articles shall be evenly, uniformly and satisfactorily baked, that the whole product will be of the same baking texture; thus preventing the bottom of the article becoming burned, charred or over-baked, and further, to bake the top of the article as thoroughly as the bottom.

It is a well known fact in baking, that, inasmuch as the heat is most intense on the bottom, or bottom oven plate, of the class of ovens above named, and less intense at the top of said oven, the articles will be unevenly baked, and the object of my invention is to overcome this unequal distribution of the heat, and maintain approximately the same degree of heat throughout the oven, and thus produce ideal baking results.

The device can be used in connection with any kind of gas stove, gas range, gasolene stove, coal oil stove or the like, and the same results will also follow in the baking, roasting or cooking of any kind of articles other than bread, cake, biscuits or the like. Its various features and advantages will readily become apparent in the following specification.

Figure 2:
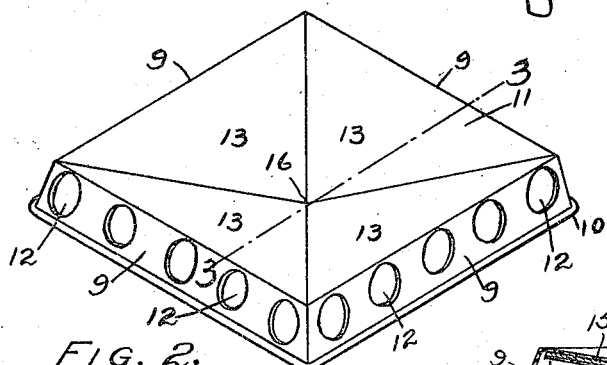
Figure 3:
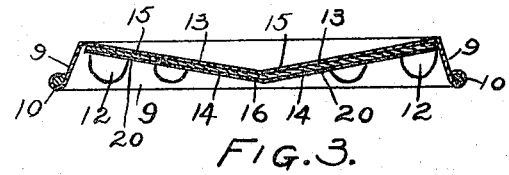

In the accompanying drawing, forming part of this specification; Figure 1, is a perspective view of a stove with my device in place in the oven. Fig. 2, is an isometric view of my device, and Fig. 3, is a section taken on the line 3—3, of Fig. 2.

In the drawing, 1 is the stove, 2 is the oven, 3 is the oven door, 4 is the top of the stove and 5 the bottom plate of the oven.
Between the bottom 5 and top 6 of the oven are placed the shelves or racks 7 and 8, upon which the baking is usually done. This oven and the racks may be of any size, shape or construction. On the bottom or bottom plate 5 of the oven I place my heat distributer. This distributer is of a form suitable to fit the oven bottom, in the present instance being square.

The heat distributer is usually and preferably made pan shaped, having oblique sides and ends, and preferably dish shaped, the dish shape being formed by each end and side of the top 11, at the top being of a triangular shape and dipping down to the center, where the lowest point of the inclination is reached, this point however being slightly above the bottom line of the sides and ends, so that when placed in the oven the device will not tilt or rock, but rest in the oven evenly. This top and the sides and ends are usually made of one piece. The sides and ends are marked 9 and at their lower outer edge are wired as shown at 10, and in these sides and ends 9, I place the holes or openings 12. The inclined or dipped parts which form the dish shape are marked 13 and the central point of the dish is marked 16, being its lower part. On the bottom of the dish shaped part or top 11 of the distributer I place a plate 14 also dish shaped to follow out the contour of the top 11. The top 11 and bottom 14 are spaced and in this space, I place a sheet of asbestos 15, or any other non-heat conducting substance, to prevent the heat from the bottom of the oven passing through the distributer and preventing its proper distribution.

The device is preferably made of thin sheet metal, but may be made of any kind of suitable material, and the holes 12 may be of any number desired and of any shape.

It will be readily understood, how my device operates, the heat striking the bottom plate 14 cannot pass through the top 11 readily, enough passing through however to properly heat the top 11, and the heat striking the inclined faces 20 or bottom plate 14, flows, deflects and radiates off to the four sides and ends 9, and passes out through the holes 12, and then up on all sides of the oven and equally heats the top, sides, middle and bottom of the oven so as to uniformly heat the contents of the oven, and properly bake the same. The top and bottom plates of the distributer may be connected together in any desired manner.

While I have described one specific contruction of my own heat distributer, it will be readily apparent that the same is capable of changes and modification without departing from the principle or spirit of the invention, and I wish it to be distinctly understood that such modifications will still fall within the scope of my invention.

What I claim as new and my invention and desire to secure by Letters Patent is:

1. In combination with the bottom plate of an oven, of a heat distributer, comprising a body portion formed of two spaced sheets having a sheet of non-conducting substance between them, said body portion depressed from each side to the center, said body portion surrounded by a downwardly extending rim, said rim provided with large holes for the equal distribution of the heat all around the distributer.

2. In connection with the bottom plate of an oven as described, a heat distributer, comprising a body portion formed of two spaced sheets having a sheet of non-connecting substance between them, said body portion depressed from each side of the distributer to the center thereof, said body portion surrounded by a flaring downwardly extending rim, said flaring rim provided with large holes throughout its entire extent, said holes being close together and almost the width of said flaring rim, the body portion by reason of its peculiar depression deflecting the heat equally on all sides of the distributer toward the said holes in the flaring rim in order to distribute the heat throughout the oven, equally on all sides.

CHARLES H. RESOR.

Witnesses:
W. H. CHATFIELD,
H. E. CARSTENS.

Copies of this patent may be obtained for five cents each, by addressing the "Commissioner of Patents, Washington, D. C."